United States Patent [19]

Proksa et al.

[11] Patent Number: 4,863,010
[45] Date of Patent: Sep. 5, 1989

[54] DOUBLE BELT CONVEYOR FOR THE CONTINUOUS PRODUCTION OF LAMINATES HAVING A FOAM CORE FOAMED IN SITU BETWEEN COVERING LAYERS

[75] Inventors: Ferdinand Proksa, Leverkusen; Hans-Michael Sulzbach, Königswinter, both of Fed. Rep. of Germany

[73] Assignee: Maschinenfabrik Hennecke GmbH, Bayerwerk, Fed. Rep. of Germany

[21] Appl. No.: 655,597

[22] Filed: Sep. 28, 1984

[30] Foreign Application Priority Data

Oct. 4, 1983 [DE] Fed. Rep. of Germany ....... 3336013

[51] Int. Cl.[4] ............................................. B65G 15/14
[52] U.S. Cl. ..................................... 198/626; 198/833
[58] Field of Search ................................. 198/833, 626

[56] References Cited

U.S. PATENT DOCUMENTS 1,706,905  3/1929  Stockly et al. ................. 198/833 X
3,760,936  9/1973  Vilen et al. ..................... 198/833 X

FOREIGN PATENT DOCUMENTS 679175   9/1966  Belgium ............................. 198/626
3018357 11/1981  Fed. Rep. of Germany .
3031130  3/1982  Fed. Rep. of Germany .

Primary Examiner—Robert J. Spar
Assistant Examiner—D. Glenn Dayoan
Attorney, Agent, or Firm—Gene Harsh

[57] ABSTRACT

The polygon effect in a double belt conveyor for the continuous production of laminates having a foam core foamed in situ between covering layers is avoided in that the slat belts are provided with guiding rails in the deflection areas, and in that the slat belts are driven by rotating pulling elements. The driving elements of the pulling elements engage on catches which are arranged along the slat belts, only in the sections of straight-line motion of the slat belts.

7 Claims, 1 Drawing Sheet

DOUBLE BELT CONVEYOR FOR THE CONTINUOUS PRODUCTION OF LAMINATES HAVING A FOAM CORE FOAMED IN SITU BETWEEN COVERING LAYERS

BACKGROUND OF THE INVENTION

The present invention relates to a double belt conveyor for the continuous production of laminates having a foam core foamed in situ between covering layers, from a flowable reaction mixture, comprising a lower endless slat belt and an upper endless slat belt, which belts are provided with guiding devices, the slat belts forming the boundary of a foaming area between them, having a common drive and rotating at the same speed.

Double belt conveyors of the type described above have been constructed in such a way that the slat belts are driven via deflecting wheels positioned at the discharge end of the conveyor. For the purpose of synchronous running, the upper slat belt is driven by a cardan drive which is coupled to the drive of the lower slat belt, or by an equivalent non-slip power transmission. The individual slats of the slat belts cannot be made as narrow as one would wish due to cost and stability. A so-called "polygon effect" is thus produced due to the polygon-like design of the deflecting wheels. This results in the slat belts travelling at a pulsating speed. This effect becomes even greater as the width of the slats increases. Additionally, there is a periodic rise and fall of the individual slats.

Various attempts have been made to eliminate or reduce the polygon effect.

The possibility of increasing the diameter of the deflecting wheels cannot be considered due to the greater (and in most cases unacceptable), structural height of the double belt conveyor which would result. The alternative possibility of providing narrower slats has also been rejected for reasons which have been mentioned above.

A proposal has been made (German Offenlegungsschrift 3,018,357) to eliminate the polygon effect by electric, means. To achieve this, considerable investment in transmitters and electrical control circuits having desired/actual value comparison is necessary.

According to a further proposal (German Pat. No. 3,031,130) a deflecting wheel for a slat belt is firmly connected to a polygon-chain wheel having the same number of corners, which chain wheel is driven by a fine toothed chain with a uniform speed of rotation. By appropriately staggering the corners of the two wheels with respect to each other, the polygon effect is partially compensated.

Although both measures allow the fluctuations in speed to be reduced, they do not adequately prevent the rise and fall of the slats.

Finally, a further proposal is based on extending the running rails for the slat belts into the moving or rotating region of the deflecting chain wheels, thereby ensuring that the running rails also provide guidance in the transitional area. This prevents the rise and fall of the slats but not the polygon effect itself.

The object of the present invention is to eliminate the polygon effect or to reduce the effects thereof in such a way that both the pulsating speed of the slat belts and the rise and fall of the slats are prevented to as large an extent as possible.

DESCRIPTION OF THE INVENTION

Figure 1:
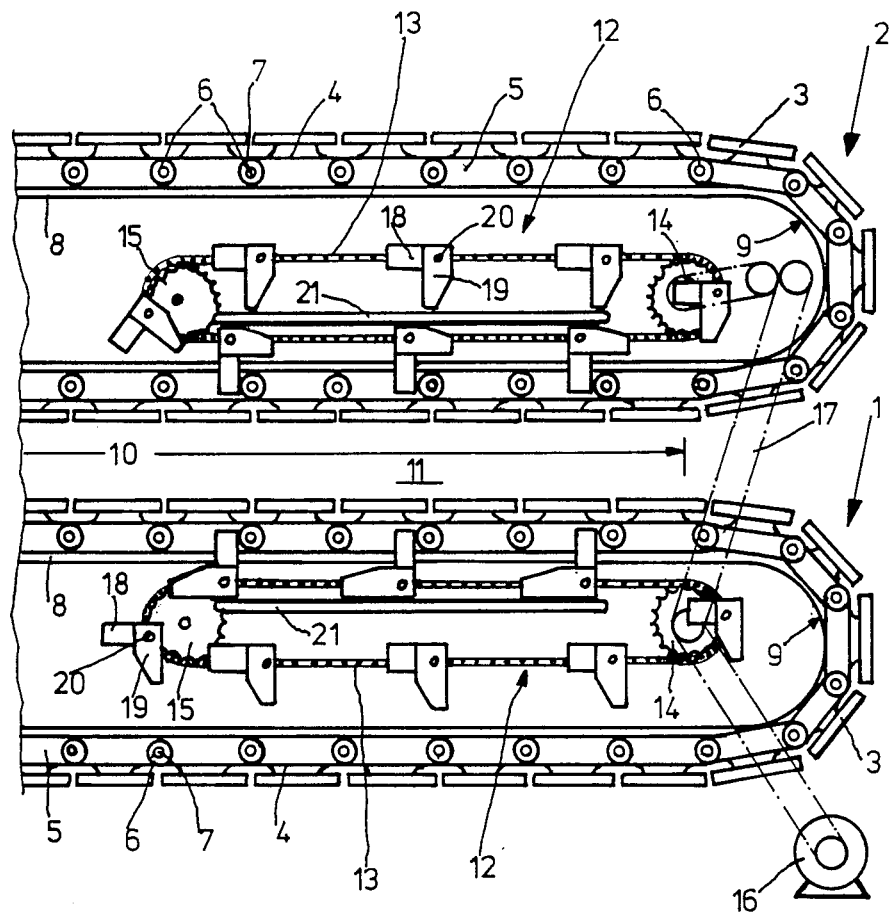
FIG. 1 illustrates one embodiment of the present invention.

The above objects are achieved by providing the slat belts with guide rails throughout their deflection regions and by providing endless pulling elements for transmitting power from the drive to the slat belts, which pulling elements rotate via deflecting wheels and are provided with driving elements. The driving elements engage on catches, which are arranged along the slat belts, only in the region of the sections of the slat belts which move in a straight line and face the foaming area.

This means that the driving and the deflection of the slat belts take place independently of each other. The endless pulling elements may be designed in such a way that they have virtually no polygon effect themselves. A catch is arranged on each slat or each $n^{th}$ slat, each of which catches is designed for the engagement of one driving element of the pulling element. At least one driving element must be completely engaged on one catch per slat belt, to ensure a uniform speed. As the slat belts are guided on guiding rails over the entire deflecting area, there is no need for deflecting wheels. This ensures that the slat belts are pushed forward at a uniform speed. Naturally, the driving elements only have to be engaged over a short section of the sections of straight-line motion. This engaging section is most favorably positioned shortly before the deflection regions at the discharge end of the slat belts.

The driving elements are preferably arranged on tilting blocks attached to the pulling elements, which tilting blocks are guided on supporting rails in the engaging section of the driving elements and take up a tilted position outside the region covered by the supporting rails. In this position, the driving elements are disengaged.

In this manner it is ensured that the driving elements become disengaged immediately so that no unwanted effects are possible.

The pulling elements can be designed in various ways. They can consist of chains having a small pitch of toothed belts or of cables or belts which are guided in a non-slip manner.

A slight polygon effect occurs if chains are used. However, it is possible to use such finely-linked chains that the polygon effect is virtually unnoticeable.

Preferably the deflecting wheels for the pulling elements have a smaller radius than the radius of the guiding rails in the deflection regions of the slat belts. This design is particularly advantageous in that it has a smaller turning moment so that the drive leading from the lower slat belt to the upper slat belt for the deflecting wheel of the pulling element for the upper belt can have markedly smaller dimensions.

According to a further particular embodiment, the deflecting wheels and the pulling elements are arranged in the free spaces between the upper and lower runs of the slat belts.

If the double belt conveyor is not too large, it is possible to arrange only one pulling element for the upper and one pulling element for the lower slat belt along the longitudinal axis. In the case of the larger double belt conveyors the parallel arrangement of two pulling elements symmetrically to the longitudinal axis is recommended. In this case the catches for the engagement of the driving elements are advantageously arranged on the chains which carry the individual slats.

Another particular embodiment is characterized by a pulling element having deflecting wheels, which is arranged on at least one longitudinal side. This driving system is thus made more easily accessible, but requires more space and obstructs the lateral access to the foaming area. A further addition to this embodiment consists in providing one pulling element for both slat belts on at least one longitudinal side and arranging the drivers in pairs accordingly. The deflecting wheels are most favorably arranged horizontally in this embodiment. This not only eliminates the necessity for a further pulling element in addition to deflecting wheels but also allows the omission of the device for transmitting power to the deflection wheel allocated in the upper belt. A considerable amount of space is however required at the side of the double belt conveyor itself for this embodiment.

A drawing of an embodiment of the double belt conveyor of the invention is shown diagrammatically in a lateral view in FIG. 1. Parts, (such as frame, supports and the like) which are present as a matter of course, have not been shown for reasons of clarity, but would be apparent to the art.

The double belt conveyor consists of a lower slat belt 1 and an upper slat belt 2. Both slat belts 1, 2 comprise slats 3, which are secured onto two carrier chains 4 (arranged one behind the other). One chain link 5 having rollers 6 is allocated to each slat 3. Every second roller 6 is wider and simultaneously acts as a catch 7. The carrier chains 4 run on guide rails 8 which run endlessly (that is also through the deflection regions 9). The two slat belts 1,2 form the boundary of a foaming area 11 between their straight-line sections 10. Identical drive system 12 which essentially operate in a mirror-inverted manner are allocated to the lower slat belt 1 and to the upper slat belt 2. More specifically, the drive systems each comprise two pulling elements 13 (in the drawing only one pulling element is depicted for each slat belt) arranged one on each side of each slat belt 1, 2 and consisting of chains having a small pitch which rotate around deflecting wheels 14, 15. A driving motor 16 is assigned to the deflecting wheel 14 of the lower slat belt 1. The deflecting wheel 14 of the upper slat belt 2 is driven by the lower deflecting ,wheel 14 via a chain and toothed wheel drive 17. (This embodiment was chosen instead of a cardan drive merely because it can be shown more clearly diagrammatically). A number of driving elements 18, whose number corresponds to half the number of slats 3 or to the number of catches 7 of each slat belt 1, 2 are arranged on tilting blocks 19 which are attached to the pulling element 13. These tilting blocks 19 are shown in a very simplified manner. They are mounted on pivots 20 on the pulling element 13 and are dimensioned in such a way that they tilt by the pull of gravity as soon as they are outside the region of the supporting rails 21. The length of the supporting rails 21 is such that at least two driving elements 18 always engage on the catches 7 so that the slat belts 1, 2 advance in a uniform manner. The tilted blocks 19 rotate with the pulling elements 13 and on running onto the supporting rails 21 are again in an engaged position so that each driving element 18 engages on the associated catch 7.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A double belt conveyor for the continuous production of laminates, having a foam core foamed in situ between covering layers comprising (i) a lower endless slat belt and an upper endless slat belt, which belts are provided with guiding devices, said slat belts forming the boundary of a foaming area between them, said slat belts having a common drive and rotating at the same speed, wherein said slat belts are provided with guide rails throughout their deflecting regions and (ii) endless pulling elements for transmitting power from said drive to the slat belts, which pulling elements rotate via deflecting wheels and are provided with driving elements, said driving elements engaging catches arranged along the slat belts, said engaging occurring only in the region of those sections of the slat belts which move in a straight line and face the foaming area.

2. A double belt conveyor according to claim 1, wherein the driving elements are arranged on tilting blocks attached to the pulling elements, which tilting blocks are guided on supporting rails in the engaging section of the driving elements and take up a tilted position outside the region covered by the supporting rails.

3. A double belt conveyor according to claim 1, wherein the pulling elements comprise chains of a small pitch.

4. A double belt conveyor according to claim 1, wherein the pulling elements comprise toothed belts.

5. A double belt conveyor according to claim 1, wherein the pulling elements comprise cables or belts which are guided in a non-slip manner.

6. A double belt conveyor according to claim 1, wherein the deflecting wheels for the pulling elements have a smaller radius than the radius of the guiding rails in the deflecting regions of the slat belts.

7. A double belt conveyor according to claim 1, wherein the deflecting wheels and pulling elements are arranged in the spaces between the upper and lower runs of the slat belts.

* * * * *